United States Patent [19]
Serio

[11] Patent Number: 5,660,521
[45] Date of Patent: Aug. 26, 1997

[54] WATER PUMP SEAL COOLANT WICK

[75] Inventor: John A. Serio, Lake in the Hills, Ill.

[73] Assignee: Navistar International Transportation Corp., Chicago, Ill.

[21] Appl. No.: 618,146

[22] Filed: Mar. 19, 1996

[51] Int. Cl.⁶ .................................................. F04D 29/12
[52] U.S. Cl. ..................... 415/111; 415/168.2; 415/230; 415/231
[58] Field of Search ..................... 415/111, 112, 415/113, 168.1, 168.2, 169.1, 230, 231, 170.1, 174.2; 123/41.44; 417/364; 277/23, 24, 65, 71, 79

[56] References Cited

U.S. PATENT DOCUMENTS

| | | | |
|---|---|---|---|
| 2,375,085 | 5/1945 | Curtis | 415/168.2 |
| 3,549,277 | 12/1970 | De Kiss et al. | 415/168.2 |
| 5,131,809 | 7/1992 | Gesenhues et al. | |
| 5,154,576 | 10/1992 | Dorski et al. | |
| 5,226,786 | 7/1993 | Dorski et al. | |
| 5,228,827 | 7/1993 | Cordts et al. | 415/168.2 |
| 5,336,047 | 8/1994 | Kolhouse | |
| 5,338,153 | 8/1994 | Swanson et al. | |
| 5,490,762 | 2/1996 | Feucht et al. | |

*Primary Examiner*—Christopher Verdier
*Attorney, Agent, or Firm*—Dennis K. Sullivan

[57] ABSTRACT

A water seal coolant wick comprises a ring of absorbent material, such as felt, disposed in the drain cavity between the inner radial face of a water pump seal in a water pump and the bearing housing so that the wick is disposed in the leakage path between the seal and the drain cavity weep hole, the wick preferably completely filling the drain cavity and acting to absorb insignificant weepage from the seal and keep it within the housing, out of sight, while allowing substantial leakage, which would be indicative of pump failure, to flow out of the weep hole.

5 Claims, 1 Drawing Sheet

5,660,521

WATER PUMP SEAL COOLANT WICK

BACKGROUND OF THE INVENTION

The present invention relates cooling water pump assemblies for internal combustion engines of the type having a water pump seal for preventing leakage of coolant along the pump shaft and, more particularly, to a wick for use in collecting and retaining insignificant amounts of coolant which escape past the water pump seal before the coolant weepage becomes visually noticeable.

THE PRIOR ART

Internal combustion engine water pumps typically include a housing in which one end of a rotating pump shaft is mounted by bearings and a pumping chamber into which the other end of the pump shaft extends and to which the pump impeller is attached. A mechanical water pump face seal is mounted between the rotating pump shaft and the housing and a weep hole is disposed in the housing between the water pump seal and the bearing assembly so that any coolant which escapes past the seal will escape from the housing, signal a failure of the pump seal, and not otherwise interfere with the engine.

The problem of noticeable insignificant weepage of coolant past a coolant seal's primary face and its mating ring has been of long standing. In most instances, small amounts of sporadic weepage may occur and leak out of the weep hole leaving a visible streak on the housing. Although such small weepage is of no consequence in pump function, when noticed by a user, it is perceived as a failure of the pump and replacement of the pump is sought. A significant number of such replacements have been found to be unnecessary. Thus, eliminating visibility of such small, sporadic occurrences of weepage is desirable.

Various complex and expensive methods and structures for eliminating minor weepage visibility have been proposed. Examples may be seen in U.S. Pat. Nos. 5,131,809, 5,154,576, 5,226,786, 5,336,047, and 5,338,153 and include provision of a drip cup for collecting the weepage until it is gradually evaporated into the ambient environment, and creating a self-sealing pump wherein a secondary seal is created by particulate matter in the weepage collecting against a barrier in the flow path, clogging the flow path over time and creating a plug in the weepage path which is only overcome by excessive leakage signaling required repair. Further as shown in U.S. Pat. No. 5,131,809, it is known to provide a porous disk within a waterproof cup like member positioned between the weep hole and the bearing assembly so that leakage from the primary seal is kept away from the bearing until heat from the rotating shaft causes evaporation thereof, with evaporation taking place through openings penetrating the bearing cover on opposing sides of the shaft. However, this does not solve the problem since small amounts of leakage past the seal do not encounter the disk but rather can freely exit the housing through the weep hole.

SUMMARY OF THE INVENTION

Accordingly, it is a primary object of the invention to provide a simple and inexpensive means for eliminating visibility of such insignificant weepage while allowing for visibility of significant leakage to signal required replacement of a failed pump.

The object is met by the structure of the present invention which comprises a wick of absorbent material abutting against the primary water seal between the seal and the weep hole so that insignificant weepage will be contained by the wick until evaporated, while significant leakage is allowed access to the weep hole.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
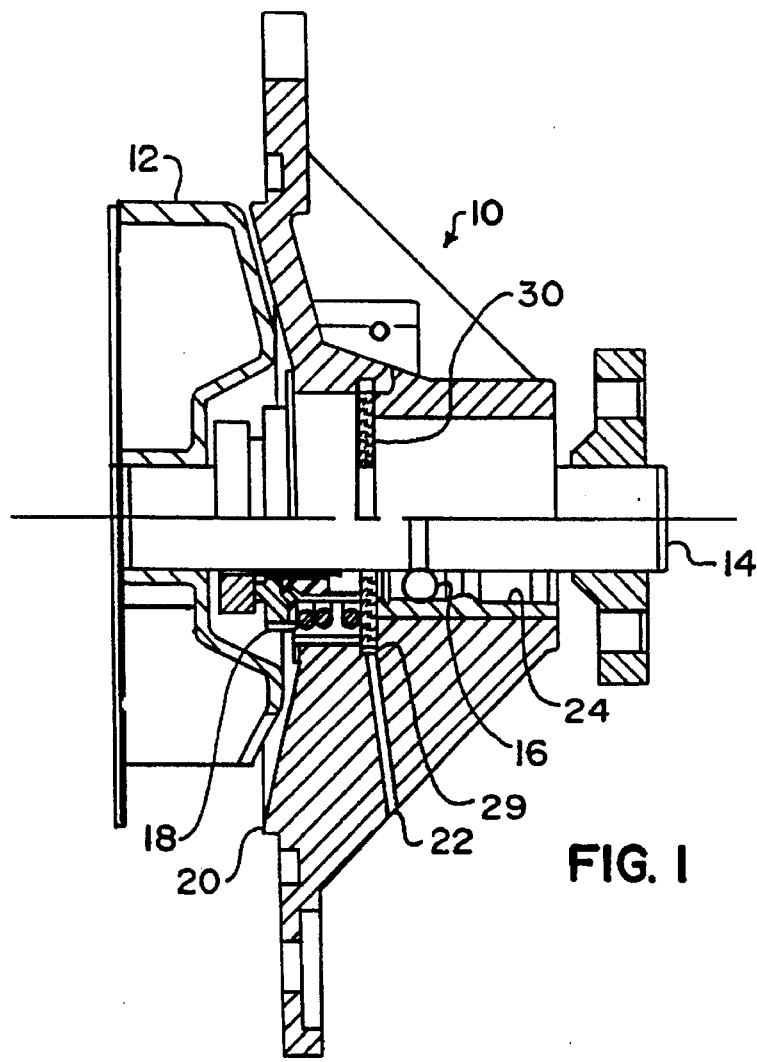
FIG. 1 is a cross-section through an engine water pump and shows the water seal and leakage drain opening or weep hole.

Referring now the drawings in greater detail, there is illustrated therein a water pump 10, such as that used in cooling an internal combustion engine (not shown). Such pump 10 includes an impeller 12 mounted on a rotating shaft 14, with the rotating shaft being mounted in an outer bearing race 24 mounted in a reduced diameter portion of the pump housing 20 by bearings 16, a bearing seal 17 being disposed between the bearings 16 and the end of the outer bearing race 17, the reduced diameter portion forming a shoulder 28 in the housing.

Figure 2:
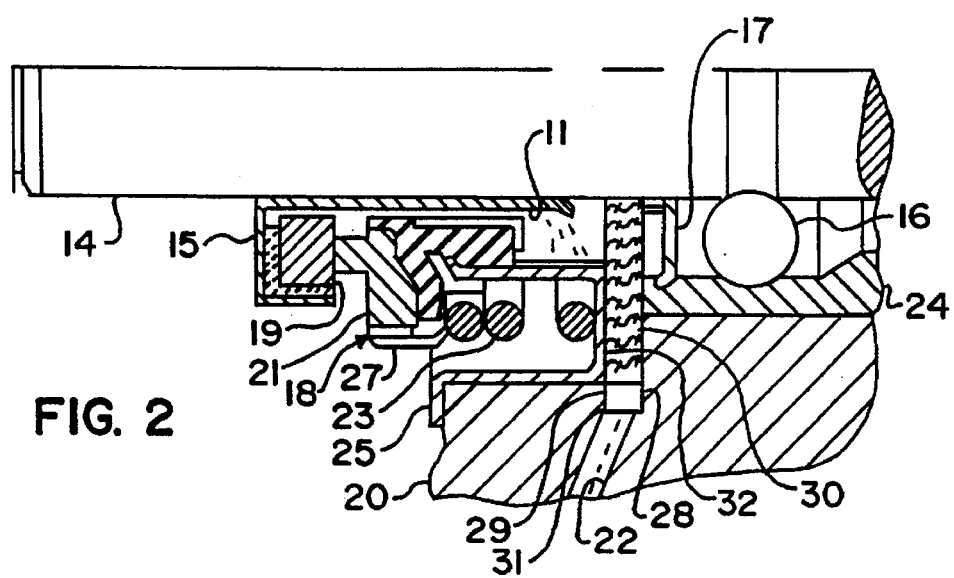
FIG. 2 is an enlarged section of a portion of the water pump of FIG. 1 and shows the wick of the present invention positioned adjacent the primary seal and seating over the leakage drain or weep hole.

As best shown in FIG. 2, a primary fluid seal assembly 18, is placed about the shaft 14, interior to the impeller 12, which is located within a fluid environment, to keep coolant surrounding the impeller 12 from leaking out of the pump housing 20. The primary sealing face 19 is mounted to the pump shaft 14 through ceramic cup member 15 press fit on the shaft for rotation therewith, the cup member 15 including a sleeve portion 11 disposed about the shaft 14 and extends toward the bearings 16. A spring-loaded sealing member 21 is mounted by a cup-shaped annular spring retainer 25 having a central opening for the shaft 14, the retainer being pressed into a cylindrical drain cavity 29 formed between housing shoulder 28 and the impeller end of the housing 20 of the water pump so that the sealing member 21 is biased by spring 23 against face 19. A rubber bellows 27 extends about the non-rotating portion of the seal from the spring retainer 25 to the sealing member 21.

Due to the relative rotary motion between the sealing member 21 against the sealing face 19, seepage or weepage of the coolant past the primary fluid seal 18 may occur. The leakage path extends between the sealing faces 19,21 and along the outer periphery of the sleeve 11 and through the central opening in the spring retainer 25 into the drain cavity 29. The drain cavity is provided with a drain groove 31 adjacent the shoulder 28 and a weep hole 22 is drilled from the drain groove 31 of the housing drain cavity 29 to the exterior of the housing so that coolant leaks will be transferred outside of the housing and visible if a significant leak occurs.

In accordance with the invention, a coolant wick 30 comprising a cylindrical washer-like member of absorbent material, preferably extra-firm felt having 80% minimum wool content as defined in SAE Standard J-314 promulgated by the Society of Automotive Engineers, is disposed about the shaft 14, as by a light press fit thereon, and extends radially from the shaft 14 to the limits of the drain cavity 29, excluding the drain groove 31. The coolant wick 30 is compressed by the inner face 32 of the spring retainer 25 against the bearing race 24 and housing shoulder 28 such that the wick 30 substantially fills the entire drain cavity 29 and covers the entrance to the drain groove 31 and the weep hole 22. The wick 30 is capable of absorbing and containing small amounts of leakage past the sealing faces 19, 21 rather than allowing the leakage to exit the weep hole 22. Eventually, heat from the rotating shaft 14, will cause evaporation of leakage collected by the wick 30 and escape of the vapor through the weep hole 22. However, the absorbent capacity of wick 30 is only sufficient to accommodate weepage but is not absorbent enough to retain substantial leakage if the pump seal 18 becomes defective, such leakage flowing from the weep hole 22.

As described above, the coolant wick of the present invention provides a number of advantages, some of which have been described above and others of which are inherent in the invention. Also, modifications can be proposed to the wick without departing from the teachings herein. Accordingly, the scope of the invention is only to be limited as necessitated by the accompanying claims.

What is claimed is:

1. In a water pump of an internal combustion engine of the type having a housing, a shaft rotatably mounted on the housing by bearings disposed in a bearing housing portion of said housing, a pump impeller mounted on said shaft, a leakage drain cavity disposed about said shaft in said housing adjacent said bearing housing portion, a weep hole extending from said drain cavity exteriorly of said housing, and a water pump seal disposed between said pump impeller and said drain cavity, said water pump seal having a radially extending inner face disposed adjacent said drain cavity and having a central opening defining a leakage path therethrough to said drain cavity and said weep hole, the improvement comprising a coolant wick comprising a mass of coolant absorbent material disposed in said drain cavity, said mass being disposed in contact with said water pump seal inner face and forming an absorbent barrier in said leakage path between said central seal opening and said weep hole, said coolant wick extending across and completely covering the intersection of said weep hole with the inner periphery of said pump housing.

2. The invention in accordance with claim 1 wherein said coolant wick completely fills the drain cavity between said water pump seal inner face and said bearing housing portion.

3. The invention in accordance with claim 1 and said mass comprising a cylindrical disk disposed about said shaft.

4. The invention in accordance with claim 1 and a drain groove being disposed peripherally about said drain cavity in fluid communication therewith, said weep hole intersecting said drain groove.

5. In a water pump of an internal combustion engine of the type having a housing, a shaft rotatably mounted on the housing by bearings disposed in a bearing housing portion of said housing, a pump impeller mounted on said shaft, a leakage drain cavity disposed about said shaft in said housing adjacent said bearing housing portion, a weep hole extending from said drain cavity exteriorly of said housing, and a water pump seal disposed between said pump impeller and said drain cavity, said water pump seal having a radially extending inner face disposed adjacent said drain cavity and having a central opening defining a leakage path therethrough to said drain cavity and said weep hole, the improvement comprising a coolant wick comprising a mass of coolant absorbent material disposed in said drain cavity, said mass being disposed in contact with said water pump seal inner face and forming an absorbent barrier in said leakage path between said central seal opening and said weep hole, said wick comprising felt of 80% minimum wool content.

* * * * *